United States Patent
White et al.

(10) Patent No.: US 7,722,909 B1
(45) Date of Patent: May 25, 2010

(54) TERPENE ESTER COMPOUNDS AS AUTOXIDATION INHIBITORS FOR FRYING OILS

(75) Inventors: Pamela J. White, Ames, IA (US); Earl G. Hammond, Ames, IA (US); Baran Onal Ulusoy, Maltepe/Ankara (TR)

(73) Assignee: Iowa State University Research Foundation, Ames, IA (US)

( * ) Notice: Subject to any disclaimer, the term of this patent is extended or adjusted under 35 U.S.C. 154(b) by 1395 days.

(21) Appl. No.: 11/126,014

(22) Filed: May 10, 2005

Related U.S. Application Data (60) Provisional application No. 60/569,656, filed on May 10, 2004.

(51) Int. Cl.
A23D 7/00 (2006.01)
A23D 7/06 (2006.01)
A23D 9/00 (2006.01)
A23D 9/06 (2006.01)
C11B 5/00 (2006.01)
C09K 15/00 (2006.01)

(52) U.S. Cl. .................. 426/541; 252/397; 426/330.6; 426/531; 426/601; 554/224

(58) Field of Classification Search .......... 426/531, 426/601, 330.6, 541; 252/397; 554/224
See application file for complete search history.

(56) References Cited

U.S. PATENT DOCUMENTS 4,806,374 A * 2/1989 Willemse ............... 426/330.6
5,981,781 A * 11/1999 Knowlton ................. 554/224
2003/0180424 A1 * 9/2003 Friedman et al. ......... 426/330.6

FOREIGN PATENT DOCUMENTS

EP 667105 A1 * 8/1995

OTHER PUBLICATIONS

Yan et al., Linalyl Aetate and Other Compunds with Related Structures as Antioxidants in Heated Soybean Oil, J. Agric. Food Chem. 1990, 38, 1904-1908 (1990).*
Freeman et al., "Use of Silicones in Frying Oils," *JAOCS* 50:101-103 (1973).
Rock et al., "Methyl Silicone in Frying Fats—Antioxidant or Prooxidant?" *JAOCS*, 44:102a (1967) (abstract).
Lorenz, "Dimethyl Polysiloxanes in Baking and Frying Fats and Oils," *The Bakers Digest* 52:36-40, 69 (1978).
Fioriti et al., "The Unsaponifiables of *Vernonia anthelmintica* Seed Oil," *JAOCS* 48:240-244 (1971).
Gordon & Magos, "The Effect of Sterols on the Oxidation of Edible Oils," *Food Chemistry* 10:141-147 (1983).

(Continued)

*Primary Examiner*—Brent T O'Hern
(74) *Attorney, Agent, or Firm*—Nixon Peabody LLP (57) ABSTRACT

The present invention relates to a method of preventing or reducing oxidation of a frying oil during frying. The method involves adding a terpene ester compound, including a terpenol esterified to a fatty acid, to a frying oil under conditions effective to prevent or reduce oxidation of the frying oil during frying. Also disclosed are frying oil compositions containing a frying oil and a terpene ester compound including a terpenol esterified to a fatty acid, as well as food products fried with such frying oil compositions.

20 Claims, 3 Drawing Sheets linalool linalyl acetate (LA)

OTHER PUBLICATIONS

Idler et al., "Separation and Tentative Identification of Two New Sterols from Oats," *JACS* 75:1712-1715 (1953).

Sims et al., "Sterol Additives as Polymerization Inhibitors for Frying Oils," *JAOCS* 49(5):298-301 (1972).

White & Armstrong, "Effect of Selected Oat Sterols on the Deterioration of Heated Soybean Oil," *JAOCS* 63(4):525-529 (1986).

Yan & White, "Linalyl Acetate and Methyl Silicone Effects on Cholesterol and Triglyceride Oxidation in Heated Lard," *JAOCS* 68(10):763-768 (1991).

Yan & White, "Linalyl Acetate and Other Compounds with Related Structures as Antioxidants in Heated Soybean Oil," *J. Agric. Food Chem.* 38:1904-1908 (1990).

Tian & White, "Antioxidant Activity of Oat Extract in Soybean and Cottonseed Oils," *JAOCS* 71(10):1079-1086 (1994).

Xing & White, "Identification and Function of Antioxidants from Oat Groats and Hulls," *JAOCS* 74(3):303-307 (1997).

Tian & White, "Antipolymerization Activity of Oat Extract in Soybean and Cottonseed Oils Under Frying Conditions," *JAOCS* 71(10):1087-1094 (1994).

Onal-Ulusoy et al., "Linalyl Oleate as an Antioxidant for Frying Oils," *95th AOCS Annual Meeting & Expo*, Cincinnati, Ohio (May 9-12, 2004) (Abstract only).

Onal-Ulusoy et al., "Linalyl Oleate as an Antioxidant for Frying Oils," *95th AOCS Annual Meeting & Expo*, Cincinnati, Ohio (May 9-12, 2004) (Powerpoint presentation).

White, "Novel Natural Antioxidants and Polymerization Inhibitors in Oats," In *Natural Protectants Against Natural Toxicants*, W.R. Bidlack and S.T. Omaye eds., Technomic Pub. Co., Inc., Lancaster, PA 1:35-49 (1995).

Rock et al., "Factors Affecting the Rate of Deterioration in the Frying Quality of Fats II. Type of Heater and Method of Heating," *JAOCS* 41:531-533 (1964).

Onal-Ulusoy et al., "Linalyl Oleate as a Frying Autoxidation Inhibitor," *JAOCS* 82(6):433-438 (2005).

* cited by examiner

| Sterol | Double Bond |
|---|---|
| Δ⁵—Avenasterol | 5,24(28) |
| Δ⁷—Avenasterol | 7,24(28) |

$CH_3 - CH = C\left\langle\right.$
ethylidene side chain linalool linalyl acetate (LA)

TERPENE ESTER COMPOUNDS AS AUTOXIDATION INHIBITORS FOR FRYING OILS

This application claims the benefit of U.S. Provisional Patent Application Ser. No. 60/569,656, filed May 10, 2004, which is hereby incorporated by reference in its entirety.

FIELD OF THE INVENTION

The present application relates to methods of preventing or reducing oxidation of a frying oil during frying by adding a terpene ester compound to the frying oil. The present application also relates to frying oil compositions containing a frying oil and a terpene ester compound, as well as food products fried with such frying oil compositions.

BACKGROUND OF THE INVENTION

During frying, fat is exposed to elevated temperatures and atmospheric oxygen, resulting in deterioration in flavor, color, and nutritive value of the oil, especially reductions in essential fatty acids. The main changes occurring during frying include oxidation, hydrolysis, and polymerization.

Oxidation can be retarded by adding antioxidants, but most phenolic antioxidants undergo distillation or destruction in deep-fat frying conditions, thus, minimizing their protective effect under these conditions. The commonly used synthetic autoxidation inhibitor for frying oil is poly(dimethylsiloxane) (MS) (Gordon, "The Mechanism of the Antioxidant Action in Vitro, in Hudson, ed., *Food Antioxidant*, Elsevier, pp. 13-14 (1990)). (The term "autoxidation inhibitor" refers to substances that inhibit autoxidation, when added to fats and oils at low concentrations and whose mechanism of action may be unknown. Such substances are commonly referred to as "antioxidants," but some use the term "antioxidants" only for substances that end free radical chains by hydrogen radical donation.) MS was originally used in frying oils to prevent foaming, and its mechanism for retarding oxidation is uncertain. One hypothesis is that it accumulates in the oil surface and acts an oxygen barrier. Disadvantages of using MS are: loss of volume in cake baking, batter defoaming in doughnut frying, and loss of crispness in fried potato chips (Frankel, *Lipid Oxidation*, pp. 244-245 Oily Press Ltd., Dundee, Scotland (1998)).

Figure 1:
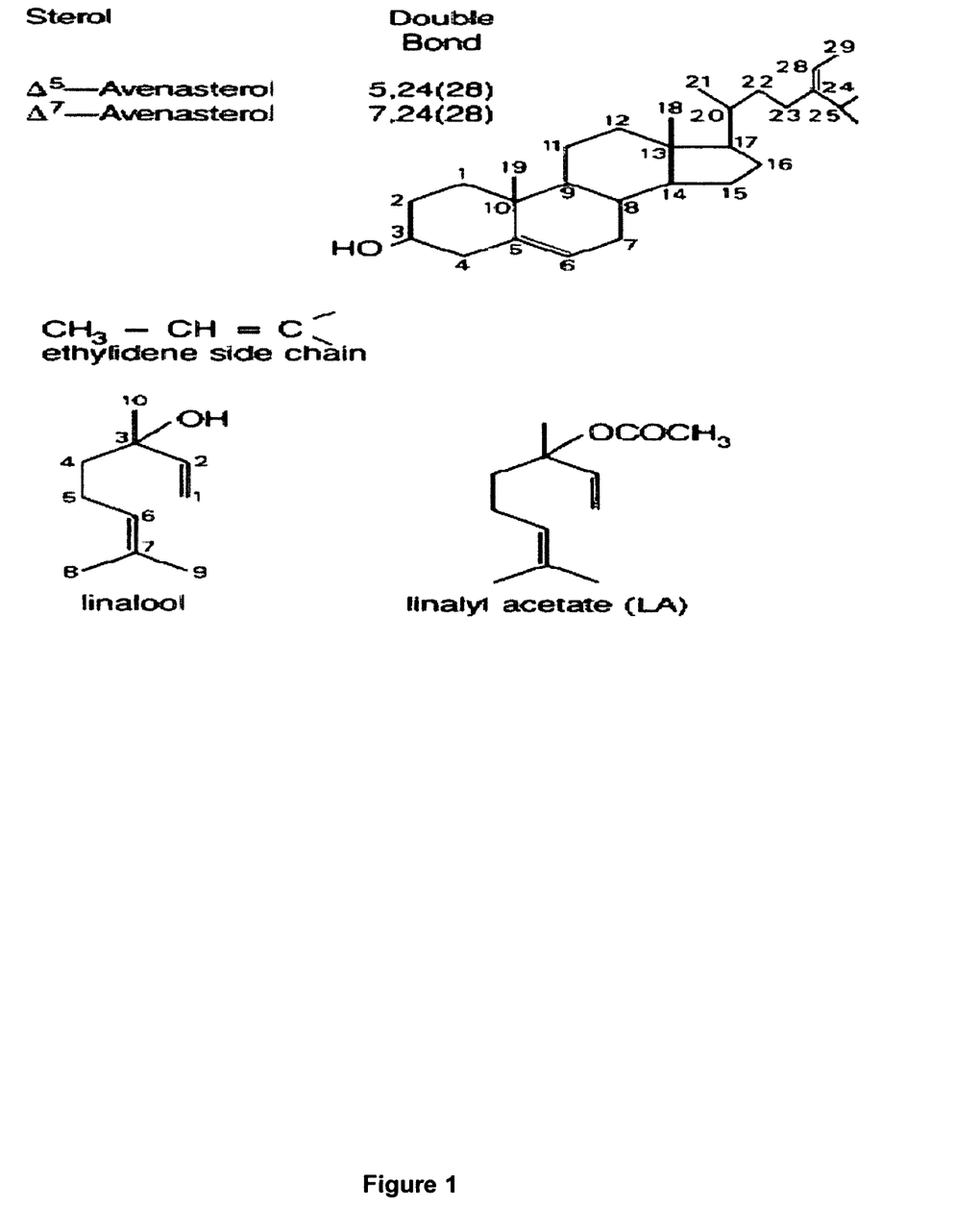
FIG. 1 shows chemical structures of compounds containing an ethylidene group.

Many people prefer to have "natural" autoxidation inhibitors in their food, but so far there has not been a natural frying autoxidation inhibitor that is effective and available. A number of plant sterols, including $\Delta^5$- and $\Delta^7$-avenasterol, vernosterol, and citrostadienol (see FIG. 1) reduce the chemical changes that occur in vegetable oils during frying (Gordon and Magos, "The Effect of Sterols on the Oxidation of Edible Oils," *Food Chem.*, 10:141-147 (1983); White and Armstrong, "Effect of Selected Oat Sterols on the Deterioration of Heated Soybean Oil," *J. Am. Oil Chem. Soc.*, 6:525-529 (1986)). Gordon and Magos (Gordon and Magos, "The Effect of Sterols on the Oxidation of Edible Oils," *Food Chem.*, 10:141-147 (1983)) theorized that the ethylidine side chain present on these sterols reacts rapidly with lipid free radicals to form "stable" allylic tertiary free radicals that are too weak to continue the oxidation chain. The ethylidene side chain forms free radicals rapidly, because of the presence of unhindered hydrogen atoms on an allylic carbon atom.

Linalool (see FIG. 1), a terpenol compound found in herbs, such as basil and coriander, contains a double bond structure similar to that found in the plant sterols, and has a prooxidative effect in frying oil when present above 0.05% (Yan and White, "Linalyl Acetate and Other Compounds with Related Structures as Antioxidants in Heated Soybean Oil," *J. Agric. Food Chem.*, 38:1904-1908 (1990)). But this prooxidative effect can be avoided by esterification of linalool's hydroxyl group, for instance with linalool acetate (LA; see FIG. 1). The disadvantages of LA are that it possesses a relatively strong flavor and tends to distill out of the fat at frying temperature.

The present invention is directed to overcoming these deficiencies in the art.

SUMMARY OF THE INVENTION

The present invention relates to a method of preventing or reducing oxidation of a frying oil during frying. The method involves adding a terpene ester compound including a terpenol esterified to a fatty acid to a frying oil under conditions effective to prevent or reduce oxidation of the frying oil during frying.

Another aspect of the present invention relates to a frying oil composition containing a flying oil and a terpene ester compound including a terpenol esterified to a fatty acid.

The present invention discloses using a terpene ester compound as a high-temperature autoxidation inhibitor to extend the life of frying oils during flying of foods. The terpene ester compound in the frying oil reduces the speed at which frying oils deteriorate, i.e., it protects oils from chemical breakdown during frying of food products. The frying oil composition of the present invention which contains the terpene ester compound improves the quality of foods fried in it by increasing the length of time the frying oil remains fresh. In turn, food fried in the flying oil composition of the present invention has better flavor characteristics. Moreover, many terpenols can be produced from natural sources, as opposed to methyl siloxane, which is a synthetic compound. Furthermore, linalool and other terpenols are known to be potent cancer inhibitors in animal models and, thus, their use (in the esterified form) as frying autoxidation inhibitors could improve consumer health as well as food quality.

DETAILED DESCRIPTION OF THE INVENTION

The present invention relates to a method of preventing or reducing oxidation of a frying oil during frying. The method involves adding a terpene ester compound including a terpenol esterified to a fatty acid to a frying oil under conditions effective to prevent or reduce oxidation of the frying oil during frying.

The terpene ester compound can be added to the frying oil at a concentration of about 0.01% to about 0.20% terpene ester in flying oil.

Examples of terpenol include, but are not limited to, linalool, geraniol, farnesol, citronellol, isopulegol, nerol, alpha-terpenol, carveol, dihydrocarveol, perillyl alcohol, menthol, borneol, and terpinen-4-ol. The fatty acid can be a substituted or unsubstituted, saturated or unsaturated fatty acid. In one embodiment of present invention, the terpene ester compound is a linalyl oleate.

The frying oil can be a plant oil or an animal oil. Examples of plant oil include, but are not limited to, soybean oil, canola oil, corn oil, olive oil, cottonseed oil, safflower oil, sunflower oil, sesame oil, palm oil, linseed oil, rapeseed oil, peanut oil, coconut oil, palm kernel oil, and combinations thereof. Examples of animal oil include, but are not limited to, lard, tallow, milk fat (including butter), fish oil, whale oil, and combinations thereof.

In another embodiment of the present invention, the frying oil is a completely or partially hydrogenated oil or a mixture thereof. In other embodiments, the frying oil is an interesterified oil or a mixture thereof.

Another aspect of the present invention relates to a frying oil composition containing a frying oil and a terpene ester compound including a terpenol esterified to a fatty acid.

The terpene ester compound can be present at a concentration of about 0.01% to about 0.20% terpene ester in frying oil. In one embodiment of present invention, the terpene ester compound is a linalyl oleate. Examples of terpenol, fatty acid, and frying oil are described above.

The present invention also relates to food products fried with the above-described frying oil compositions.

EXAMPLES

The following examples are provided to illustrate embodiments of the present invention but are by no means intended to limit its scope.

Example 1

Materials

Bleached, deodorized soybean oils, containing only citric acid was a gift from the ADM company (Decatur, Ill.). Peroxide value (PV) of the soybean oil as received were 0.1 meq/kg by the AOCS method Cd 8-53 (Firestone, ed., *Official Methods and Recommended Practices of the American Oil Chemists Society*, 4th Ed., AOCS Press, Champaign (1989), which is hereby incorporated by reference in its entirety). Olive oil was purchased from a local market.

Silica gel (40-140 mesh) used for purification of linalyl oleate (LO) reaction mixture was obtained from J.T. Baker Inc. (Phillipsburg, N.J.). Urea and sodium methylate solution in methanol (~5.4 M) was purchased from Fluka (Milwaukee, Wis.). Other chemicals were reagent grade and from Fischer (Fairlawn, N.J.).

Foodgrade polydimethyl siloxane or methyl silicone fluid (MS, 0.97 g/mL at 25° C.; viscosity, 350 centistokes; stock no. 200 (R)) was a gift from Dow Corning Co. (Midland, Mich.). Linalyl acetate (LA) was purchased from Aldrich Chemical Co. (Milwaukee, Wis.).

Methyl oleate (MO) was concentrated from olive oil by urea fractionation (Swern, "Techniques of Separation," in Markley, ed., *Fatty Acids, Their Chemistry, Properties, Production, and Uses*, Interscience Publishers:New York, pp. 2328-2329 (1964), which is hereby incorporated by reference in its entirety). An extra step was introduced to remove the saturated esters, and a distillation was not performed. Olive oil (100 g) was added to 500 mL of boiled methanol. When the mixture reached the boiling point, 5 mL of 5.4 M sodium methylate solution was added and the mixture was refluxed. Next, an additional 500 mL methanol and 210 g urea were added. The mixture was boiled until the urea dissolved, cooled to room temperature, and left overnight. The mixture was filtered to obtain a liquid fraction rich in MO and a crystalline fraction rich in methyl palmitate. An additional 150 g urea was added to the liquid fraction, and it was boiled and left overnight. The crystalline fraction was rich in MO and poor in both methyl palmitate and methyl linoleate. The crystalline fraction was stirred with water containing several drops of concentrated hydrochloric acid (pH 3.0) and the MO concentrate was collected for synthesis of LO.

Example 2

Synthesis of Linalyl Oleate

The LO was synthesized by interesterification of LA and a 10% molar excess of MO with 5 mL of 5.4 M methanolic sodium methoxide solution from which the methanol was removed under vacuum before the other reagents were added. A reduced pressure was used to remove methyl acetate and drive the reaction toward the formation of LO.

Example 3

Column Purification of Linalyl Oleate

The LO mixture was fractionated by liquid chromatography to remove unreacted MO. One gram of the reaction mixture was passed into a column (20 mm (i.d.)×18 cm) containing 10 g of silica gel using hexane/diethyl ether (1/0.005 v/v). The ether was distilled over lithium aluminum hydride to remove peroxides and the buthylated hydroxyltoluene it contained as a stabilizer. Elution fractions of 20 mL were collected, and the fourth, fifth, and sixth fractions contained 92-95% linalyl oleate by gas chromatography (GC).

Example 4

Frying Procedure and Oil Sampling

Oil samples (200 g), with and without the various additives, were heated continuously in FryBaby® 05430 (Presto, Wisconsin, Ill.) deep fat fryers at 180±5° C. for 32 h. Autoxidation inhibitors were dissolved in distilled ethanol and the ethanol was vaporized before the oils were added. The LO was added to soybean oil (SBO) at levels of 0.05 and 0.1%. Methyl silicone (MS) was tested at 5 and 10 ppm. The mixture of 0.05% LO and 5 ppm MS was tested for synergistic effect, and linalyl acetate (LA) was tested at a concentration equal molar to 0.05% LO (~0.025%).

The temperature of each fryer was maintained by a variable transformer and monitored with a thermocouple. Three grams of oil were removed at 2, 4, 8, 12, 24, and 32 h for analyses and stored under nitrogen at 5° C. until analyzed. The oil removed for samples was not replenished.

Example 5

Conjugated Dienoic Acids

Conjugated dienoic acids were measured by the AOCS method Ti 1a-64 (Firestone, ed., *Official Methods and Recommended Practices of the American Oil Chemists Society*, 4th Ed., AOCS Press, Champaign (1989), which is hereby incorporated by reference in its entirety) with a Hitachi U-2000 model spectrophotometer.

Example 6

Gas Chromatographic Analyses

Fatty acid methyl esters (FAMEs) of the frying oils were prepared by transesterifying the oils with sodium methoxide in methanol and injecting in a GC, as described by Hammond, "Rapid Analysis of Lipids in Many Individual Plants," in Liskens, eds., *Modern Methods of Plant Analysis*, New Series, Vol. 12, Springer-Verlag:New York, pp. 321-330 (1991), which is hereby incorporated by reference in its entirety. A HP 5890 Series II gas chromatograph (GC) equipped with a flame ionization detector was used. A fused silica capillary column (Supelco, Bellefonte, Pa.) of 15 m×0.25 mm×1.0 µm film thickness coated with SP-2330 was used. Helium was the carrier gas (3 mL/min) and the injection port and detector temperatures were set at 230° C. The column was temperature programmed at 10° C./min from 140° C. to 225° C. and maintained at 225° C. for 5 min for the liquid and solid fractions obtained during the isolation of MO. For fatty acid compositions of the heated oil samples, the column temperature was maintained at 190° C. for 5 min. For the linalyl oleate, the column was programmed at 10° C./min from 100° C. to 225° C. A MicroMass CA 062 GC-MS with a DB-23 (Agilent, Wilmington, Del.) fused silica capillary column (30 m×0.25 mm×0.2 µm film thickness) and an Agilent 6890 series gas chromatograph were used to verify the chemical structure of LO. The injection and detection port temperatures were both 230° C. The column was held at 80° C. for 1 min and raised at 20° C./min from 80° C. to 260° C. and held for 5 min with helium as the carrier gas. The split ratio was 50%.

Example 7

Nuclear Magnetic Resonance (NMR) Spectra $^1$H NMR spectra was obtained on a Varian VXR 300-MHz instrument (Palo Alto, Calif.).

Example 8

Surface Tension Measurement

A FACE Automatic Surface Tensiometer Model CBVP-Z (Kyowa Interface Science Co. Ltd.; Schaumberg, Ill.) was used for measuring surface tension.

Example 9

Statistical Analysis

All data are the average of replicate experiments. Data from analyses were analyzed statistically using the analysis of variance (one-way ANOVA) by means of general linear models procedure of a SPSS 9.0 software package. Surface tension data were also analyzed using a paired comparison t-test.

Example 10

Concentration of Methyl Oleate and Column Purification of Linalyl Oleate

The MO concentrated by urea fractionation was 83.7% MO, 9.8% methyl linoleate, and 0.4% methyl palmitate, and the percentages of other peaks were lower than 1%. After the interesterification reaction of the MO and LA, the product was analyzed by GC, and it was 10.4% MO, 74.9% LO, and 8.6% linalyl linoleate. Other peaks had percentages lower than 1%. After silica column chromatography, the product consisted of 0.4% MO, 1.0% linalyl palmitate, 92.3% LO, and 2.9% linalyl linoleate, and the percentages of other peaks were lower than 1%. The yield of purified linalyl ester was 33% of the material placed on the column.

Example 11

GC and GC-MS for Identifying the Chemical Composition of Linalyl Oleate

Although LO was synthesized previously by reaction of oleyl chloride with linalool (Van Duuren et al., "Cocarcinogenesis Studies on Mouse Skin and Inhibition of Tumor Induction," *J. National Cancer Institute*, 46:1039-1044 (1971), which is hereby incorporated by reference in its entirety), adequate GC-MS or NMR spectrum for LO are lacking in the literature. The expected molecular weight of LO is ~418.72. Chemical ionization GC-MS gave a mass of 418.39. On a polar SP2330 column, LO emerged at ~205° C., but, on a nonpolar DB5 (Agilent) column, it began to decompose at 225° C. before it emerged. GC-MS revealed the primary decomposition product to be ocimine ($C_{10}H_{16}$) formed by the dehydration of linalool. Yan and White, "Linalyl Acetate and Other Compounds with Related Structures as Antioxidants in Heated Soybean Oil," *J. Agric. Food Chem.*, 38:1904-1908 (1990), which is hereby incorporated by reference in its entirety, reported that terpenols and their esters undergo elimination and rearrangement reactions, when they are subjected to intense heat, steam distillation, and/or acidic conditions.

Example 12

NMR for Identifying the Chemical Composition of Linalyl Oleate

Chemical shifts are given in ppm (δ) and multiplicities are indicated by s (singlet), d (doublet), t (triplet), q (quartet), qn (quintet), and m (multiplet). $^1$H NMR (300 MHz, $CDCl_3$, 16 mg/mL) for LO: δ: 0.87 (4H, t), 1.26 (26H, q), 1.53 (12H, q), 1.83 (9H, m), 2.25 (3H, t), 3.47 (0.7H, q), 5.09 (4H, qn), 5.34 (3H, qn), 5.91 (1.5H, q).

Example 13

Measurement of Conjugated Dienoic Acids

Figure 2A:
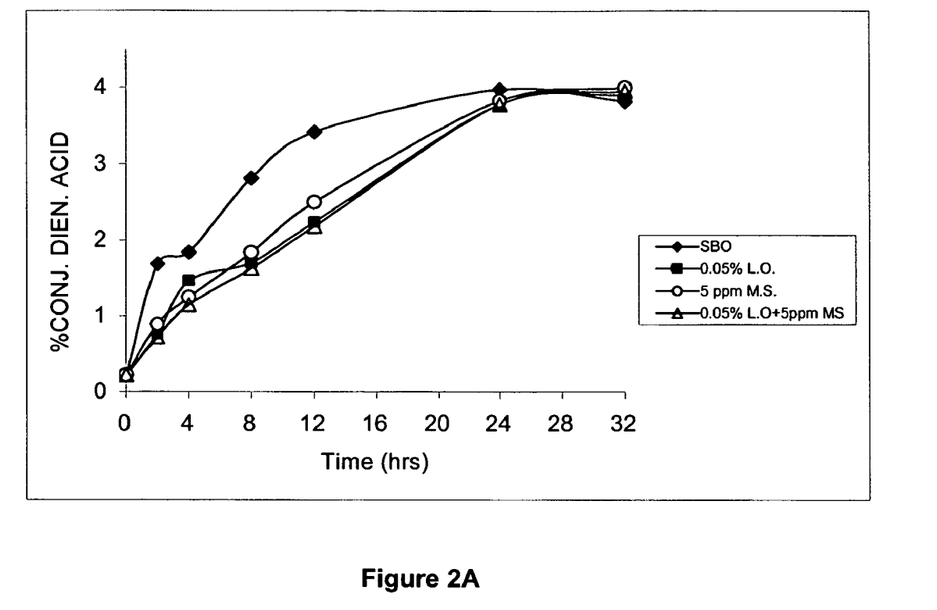
FIG. 2A shows the percentages of conjugated dienoic acid in soybean oil (SBO) protected with 0.05% linalyl oleate (LO), 5 ppm poly(dimethylsiloxane) (MS), and 0.05% LO+5 ppm MS.

The percentages of conjugated dienes (CD) of oil without additives (control) and oils with 0.05% LO, 5 ppm MS, and 0.05% LO+5 ppm MS during the 32 h heating period are shown in FIG. 2A. The percentage of CD of the control increased for 24 h, reached a plateau and then decreased. At the end of 32 h, the control had the lowest CD percentage of all the treatments. The MS and LO additives retarded the increase in percentage CD similarly, and, at the end of 32 h, their CD percentages were still increasing.

Figure 2B:
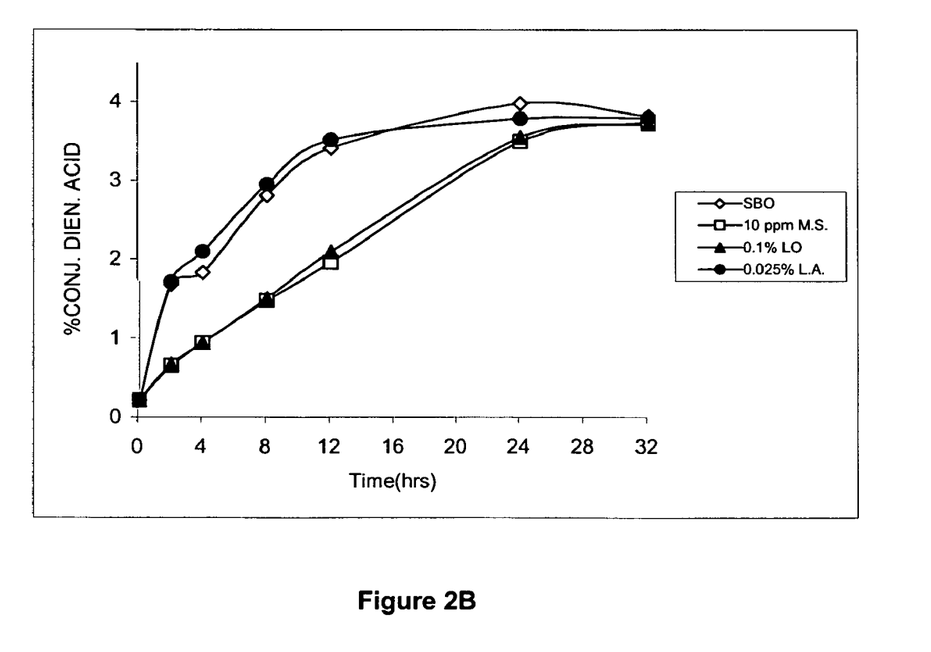
FIG. 2B shows the percentages of conjugated dienoic acid in SBO protected with 0.1% LO, 10 ppm MS, and 0.025% linalyl acetate (LA).

FIG. 2B illustrates the changes in percentage CD in control and oils with 0.1% LO, 10 ppm MS, and 0.025% LA. MS and LO showed exactly the same decrease in the formation of percentage CD relative to the control. The activity of all the additive treatments except LA was statistically significant through 24 h, compared with the control. LA didn't show any inhibitory activity and appeared to be slightly prooxidative when compared with the control. After 24 h, the percentages of CD in the control and LA-treated oil started to decrease, whereas those in oils treated with LO and MS were still increasing. Control and oils with additives reached similar CD percentages at the end of 32 h.

Conjugated dienoic acid formation and changes in fatty acid methyl esters (FAME) percentages have been shown to parallel polymer formation in heated oils (White and Armstrong, "Effect of Selected Oat Sterols on the Deterioration of Heated Soybean Oil," *J. Am. Oil Chem. Soc.*, 6:525-529 (1986); Yan and White, "Linalyl Acetate and Other Compounds with Related Structures as Antioxidants in Heated Soybean Oil," *J. Agric. Food Chem.*, 38:1904-1908 (1990); White and Wang, "A High Performance Size-Exclusion Chromatographic Method for Evaluating Heated Oils," *J. Am. Oil Chem. Soc.*, 63:914-920 (1986), which are hereby incorporated by reference in their entirety). In particular, the formation of conjugated dienoic acids has been shown to have a linear relationship with total polar compounds, which provide a reliable measure of the extent of deterioration (Fritsch, "Measurements of Frying Fat Deterioration: A Brief Review," *J. Am. Oil Chem. Soc.*, 58:272-274 (1981); Richard et al., "Quality Control in Deep-Fat Frying," *Baking Snack*, 15:67-76 (1993); Houhoula et al., "A Kinetic Study of Oil Deterioration During Frying and a Comparison with Heating," *J. Am. Oil Chem. Soc.*, 79:133-137 (2002); White, "Methods for Measuring Changes in Deep-Fat Frying Oils," *Food Technol.*, 45(2):75-80 (1991), which are hereby incorporated by reference in their entirety).

Example 14

Fatty Acid Composition

The fatty acid profiles of the control and oils with additives are shown in Table 1. Significant differences in FAME percentages for each treatment are shown for each sampling period. For all treatments, the percentages of polyunsaturated fatty acids (18:2 and 18:3) tended to decrease during heating, whereas the percentages of the saturated (16:0 and 18:0) and monounsaturated (18:0) fatty acids tended to increase. The percentages of 16:0 saturated fatty acids in samples containing all levels of LO and MS generally were significantly lower through the 32-h heating period than those in the control and oil treated with LA ($p<0.05$). After 4 h, the 18:0 and 18:1 percentages of oils containing all levels of LO and MS generally were significantly lower, and the percentages of 18:2 and 18:3 were significantly higher than those of the control and of oil containing LA ($p<0.05$). Among the oils with additives, oils containing 0.1% LO and 10 ppm MS had significantly lower 16:0, 18:0, and 18:1 percentages and higher 18:2 and 18:3 percentages than oils with lower levels of LO and MS and their mixtures ($p<0.05$).

TABLE 1

Fatty Acid Composition (%) of Soybean Oil Treatments Heated at 180 ± 5° C.

| Treatments | 16:0 | 18:0 | 18:1 | 18:2 | 18:3 |
|---|---|---|---|---|---|
| 0 Hour | | | | | |
| SBO | 10.3 | 4.4 | 25.6 | 52.1 | 7.1 |
| 2 Hours | | | | | |
| SBO | $10.9^b$ | $4.8^b$ | $24.5^c$ | $50.4^a$ | $6.4^a$ |
| 0.05% LO | $10.6^a$ | $4.5^a$ | $23.7^a$ | $51.4^{b,c,d}$ | $6.9^b$ |
| 5 ppm MS | $10.6^a$ | $4.6^{a,b}$ | $24.0^{a,b,c}$ | $51.1^{a,b,c}$ | $6.7^{a,b}$ |
| 0.05% LO + 5 ppm MS | $10.5^a$ | $4.7^{a,b}$ | $23.9^{a,b,c}$ | $51.2^{b,c,d}$ | $6.8^{a,b}$ |
| 10 ppm MS | $10.4^a$ | $4.5^a$ | $23.7^a$ | $51.8^{c,d}$ | $6.9^b$ |
| 0.1% LO | $10.5^a$ | $4.5^a$ | $23.8^{a,b}$ | $51.9^d$ | $6.9^b$ |
| 0.05% LA | $10.9^b$ | $4.7^{a,b}$ | $24.5^{b,c}$ | $50.7^{a,b}$ | $6.4^a$ |
| 4 Hours | | | | | |
| SBO | $11.4^b$ | $5.0^a$ | $25.1^a$ | $49.7^a$ | $6.0^a$ |
| 0.05% LO | $10.7^a$ | $4.8^a$ | $24.4^a$ | $50.7^{a,b}$ | $6.5^{a,b}$ |
| 5 ppm MS | $10.8^a$ | $4.8^a$ | $24.3^a$ | $50.6^{a,b}$ | $6.5^{a,b}$ |
| 0.05% LO + 5 ppm MS | $10.7^a$ | $4.8^a$ | $24.3^a$ | $50.6^{a,b}$ | $6.5^{a,b}$ |
| 10 ppm MS | $10.6^a$ | $4.6^a$ | $23.9^a$ | $51.4^b$ | $6.7^b$ |
| 0.1% LO | $10.6^a$ | $4.6^a$ | $24.0^a$ | $51.5^b$ | $6.7^b$ |
| 0.05% LA | $11.3^b$ | $4.9^a$ | $25.0^a$ | $49.8^a$ | $6.1^{a,b}$ |
| 8 Hours | | | | | |
| SBO | $11.9^b$ | $5.1^b$ | $25.6^b$ | $48.2^a$ | $5.5^a$ |
| 0.05% LO | $10.9^a$ | $4.7^a$ | $24.2^a$ | $50.4^b$ | $6.3^{a,b}$ |
| 5 ppm MS | $11.0^a$ | $4.7^a$ | $24.4^a$ | $50.2^b$ | $6.2^{a,b}$ |
| 0.05% LO + 5 ppm MS | $10.9^a$ | $4.7^a$ | $24.3^a$ | $50.5^b$ | $6.4^{a,b}$ |
| 10 ppm MS | $10.8^a$ | $4.7^a$ | $24.5^a$ | $51.0^b$ | $6.4^b$ |
| 0.1% LO | $10.8^a$ | $4.7^a$ | $24.5^a$ | $51.0^b$ | $6.4^b$ |
| 0.05% LA | $12.3^b$ | $5.3^c$ | $26.4^c$ | $48.4^a$ | $5.4^{a,b}$ |
| 12 Hours | | | | | |
| SBO | $12.8^b$ | $5.5^b$ | $26.7^b$ | $45.9^a$ | $4.8^a$ |
| 0.05% LO | $11.3^a$ | $4.8^a$ | $24.8^a$ | $49.4^b$ | $5.9^b$ |
| 5 ppm MS | $11.5^a$ | $4.9^a$ | $25.0^a$ | $49.0^b$ | $5.8^b$ |
| 0.05% LO + 5 ppm MS | $11.3^a$ | $4.8^a$ | $24.8^a$ | $49.4^b$ | $5.9^b$ |
| 10 ppm M.S. | $11.3^a$ | $4.8^a$ | $25.0^a$ | $50.2^b$ | $6.1^b$ |
| 0.1% LO | $11.2^a$ | $4.9^a$ | $24.9^a$ | $50.0^b$ | $6.0^b$ |
| 0.05% LA | $13.3^c$ | $5.7^c$ | $27.6^c$ | $45.8^a$ | $4.6^a$ |
| 24 Hours | | | | | |
| SBO | $15.6^b$ | $6.7^c$ | $30.1^{b,c}$ | $38.9^a$ | $3.0^a$ |
| 0.05% LO | $13.9^a$ | $5.9^{a,b}$ | $27.9^a$ | $44.7^{b,c}$ | $4.0^{b,c}$ |
| 5 ppm MS | $14.3^a$ | $6.1^b$ | $28.6^{a,b}$ | $42.3^b$ | $3.7^b$ |
| 0.05% LO + 5 ppm MS | $13.9^a$ | $6.0^{a,b}$ | $28.3^a$ | $43.1^{b,c}$ | $3.9^{b,c}$ |
| 10 ppm M.S. | $13.5^a$ | $5.7^{a,b}$ | $27.9^a$ | $45.4^c$ | $4.4^d$ |
| 0.1% LO | $13.6^a$ | $5.6^a$ | $28.0^a$ | $44.2^{b,c}$ | $4.2^{c,d}$ |
| 0.05% LA | $16.4^b$ | $6.9^c$ | $31.1^c$ | $38.7^a$ | $2.9^a$ |
| 32 Hours | | | | | |
| SBO | $17.2^d$ | $7.4^d$ | $31.8^c$ | $35.2^a$ | $2.4^a$ |
| 0.05% LO | $15.6^{a,b,c}$ | $6.7^{a,b,c}$ | $30.3^{a,b}$ | $38.7^{b,c,d}$ | $3.0^{b,c,d}$ |
| 5 ppm MS | $16.1^c$ | $6.9^c$ | $30.7^c$ | $37.7^b$ | $2.8^b$ |
| 0.05% LO + 5 ppm MS | $16.0^{b,c}$ | $6.8^{b,c}$ | $30.6^c$ | $38.4^{b,c}$ | $2.9^{b,c}$ |
| 10 ppm M.S. | $15.2^a$ | $6.5^a$ | $29.8^a$ | $39.9^d$ | $3.2^d$ |
| 0.1% LO | $15.4^{a,b}$ | $6.7^{a,b}$ | $30.1^{a,b}$ | $39.4^{c,d}$ | $3.1^{c,d}$ |
| 0.05% LA | $17.9^e$ | $7.6^d$ | $32.2^c$ | $34.5^a$ | $2.3^a$ |

$a,b,c,d$FAME % in the same column and the same time that have the same superscript are not significantly different ($p < 0.05$).

The ratio of 18:2 and 16:0 percentages are often used as indicators of the extent of fat deterioration, because linoleate esters are quite susceptible to oxidation, whereas palmitate esters are stable. This ratio has been reported to correlate with the iodine value and dielectric constant (Houhoula et al., "A Kinetic Study of Oil Deterioration During Frying and a Comparison with Heating," *J. Am. Oil Chem. Soc.*, 79:133-137 (2002); Augustin et al., "Relationships Between Measurements of Fat Deterioration During Heating and Frying in RBD Olein," *Food Technol.*, 64:1670-1675 (1987), which are hereby incorporated by reference in their entirety). The ratio of 18:2%/16:0% is a measure of the surviving percentage of 18:2, as frying time increases.

Figure 3A:
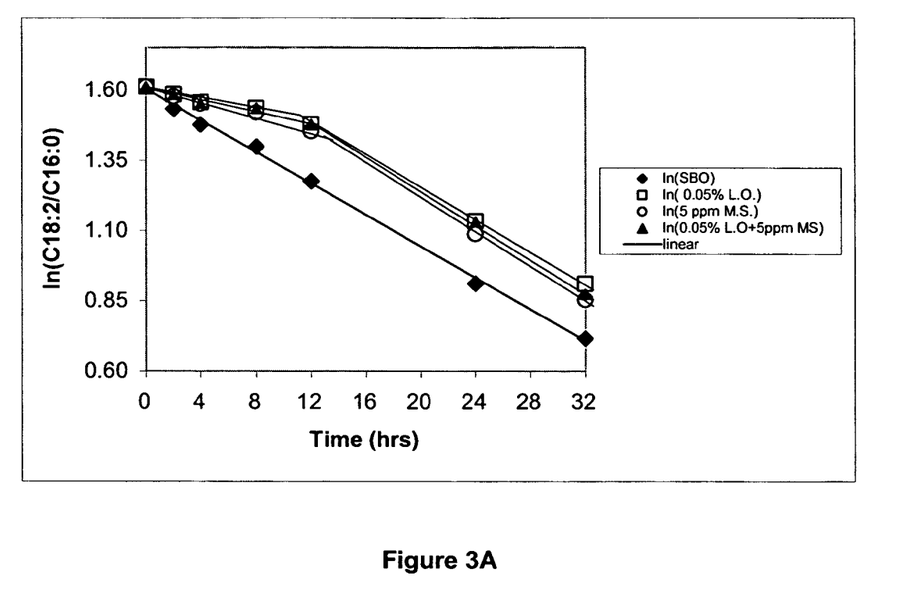
FIG. 3A illustrates the decrease of the natural logarithm of linoleate %/palmitate % for SBO (control) and SBO protected with 0.05% LO, 5 ppm MS, and 0.05% LO+5 ppm MS as a function of frying time.

In FIG. 3A, the natural logarithm of the 18:2%/16:0% values from Table 1 of control and oils with 0.05% LO, 5 ppm MS, and the 0.05% LO+5 ppm MS mixture are shown over the 32-h heating period. A linear decrease with frying time was observed for the control and the data was fitted to first-order kinetics. Oils with additives have inflection points between 11-13 h, and the reaction rate before the inflection point was lower than the reaction rate after the inflection point, but both parts of the plots show linearity.

Figure 3B:
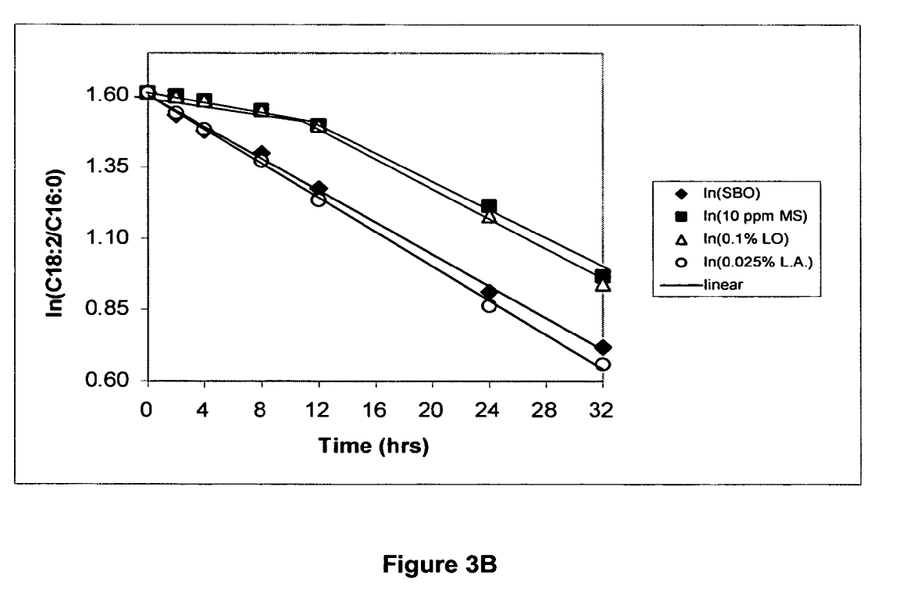
FIG. 3B illustrates the decrease of the natural logarithm of linoleate %/palmitate % for SBO (control) and SBO protected with 0.1% LO, 10 ppm MS, and 0.025% LA as a function of frying time.

FIG. 3B also shows the same tendencies of oils with 0.1% LO and 10 ppm MS that were noted with lower concentrations of these additives. The 18:2%/16:0% in oil with LA had no inflection point.

Lines were fitted before and after the inflection points of oils with additives, resulting in the reaction rate constants shown in Table 2. Oils with 10 ppm MS, 0.05% LO, and 0.1% LO had similar rate constants before and after the inflection points, and the reaction rates of oils with additives other than LA were not significantly different from each other (p>0.05). Before the inflection point, all levels of LO and MS reduced the rate of disappearance of linoleate by 2.5 or 3.1 fold, compared to control oil. After the inflection points, the rate constants were similar to those of the control oil. The inflection point of oil with 0.05% LO+5 ppm MS occurred later in frying than any of the other oils, but its reaction rate was third highest among the treatments.

TABLE 2

Rate Constants of the Changes in 18:2/16:0 Ratio During Heating at 180 ± 5° C.

| Treatments | Before Inflection Point $C_{18:2}/C_{16:0}$ k (h$^{-1}$) | Inflection Point (hr) | After Inflection Point $C_{18:2}/C_{16:0}$ k (h$^{-1}$) |
|---|---|---|---|
| Soybean oil | 0.028$^b$ | — | 0.028$^{a,b}$ |
| 0.05% LO | 0.009$^a$ | 11.1 | 0.028$^{a,b}$ |
| 5 ppm MS | 0.012$^a$ | 11.2 | 0.030$^b$ |
| 0.05% LO + 5 ppm MS | 0.011$^a$ | 12.0 | 0.030$^b$ |
| 10 ppm MS | 0.009$^a$ | 11.6 | 0.026$^a$ |
| 0.1% LO | 0.008$^a$ | 11.2 | 0.028$^{a,b}$ |
| 0.025% LA | 0.030$^b$ | — | 0.030$^b$ |

$^{a,b}$Constants within a column with the same superscript are not significantly different (p < 0.05).

Rate constants of changes in linolenate %/palmitate % are shown in Table 3. The rate constants for the control and oil with LA were 0.050/h and 0.053/h, respectively, which were greater than the rate constants for oils with either level of LO and MS. The reaction rate of oils with additives other than LA were significantly lower than the control before the inflection points. After the inflection points, the rates were comparable to those of the control. The rate of decrease in 18:3 was about 1.8 that of comparable values for 18:2, which is close to the value of 2.0 found for ambient temperature oxidation (Fatemi and Hammond, "Analysis of Oleate, Linoleate and Linolenate Hydroperoxides in Oxidized Ester Mixtures," *Lipids*, 15:379-385 (1980), which is hereby incorporated by reference in its entirety).

TABLE 3

Rate Constants of the Changes in 18:3/16:0 Ratio During Heating at 180 ± 5° C.

| Treatments | Before Inflection Point $C_{18:3}/C_{16:0}$ k (h$^{-1}$) | Inflection Point (hr) | After Inflection Point $C_{18:3}/C_{16:0}$ k (h$^{-1}$) |
|---|---|---|---|
| Soybean oil | 0.050$^b$ | — | 0.050$^{a,b,c}$ |
| 0.05% LO | 0.021$^a$ | 11.9 | 0.051$^{a,b,c}$ |
| 5 ppm MS | 0.024$^a$ | 11.7 | 0.054$^{b,c}$ |
| 0.05% LO + 5 ppm MS | 0.023$^a$ | 11.8 | 0.054$^c$ |
| 10 ppm MS | 0.020$^a$ | 12.3 | 0.047$^a$ |
| 0.1% LO | 0.019$^a$ | 12.0 | 0.049$^{a,b}$ |
| 0.025% LA | 0.053$^b$ | — | 0.053$^{b,c}$ |

$^{a,b,c}$Constants within a column with the same superscript are not significantly different (p < 0.05).

The addition of additives, except LA, exhibited autoxidation inhibition in soybean oil at deep-fat frying temperature, and the additives improved the oil's oxidative stability. Previous work reported that LA was not effective at the concentration that was used (Yan and White, "Linalyl Acetate and Other Compounds with Related Structures as Antioxidants in Heated Soybean Oil," *J. Agric. Food Chem.*, 38:1904-1908 (1990), which is hereby incorporated by reference in its entirety). The effect of a LO+MS mixture for retarding oxidation of soybean oil was not better than either 0.05% LO or 5 ppm MS and thus, showed no synergism. The results indicated that LO could replace MS in soybean oil during deep-fat frying but at levels about 100 times greater. In addition, the recommended level for LO is 5 times greater than that allowed for the phenolic antioxidants used for ambient temperature oxidation.

The kinetic plots of the oils treated with additives show an inflection at about 11 h after which the rate of disappearance of the polyunsaturates is similar to that of the control oil (Tables 2 and 3). Thus, the additives seem no longer active after about 11 h and perhaps are exhausted by the end of this period. Exhaustion of LO could support the ethylidene oxidation theory of Gordon and Magos (Gordon and Magos, "The Effect of Sterols on the Oxidation of Edible Oils," *Food Chem.*, 10:141-147 (1983), which is hereby incorporated by reference in its entirety), but it is not clear how MS would be exhausted and lose its inhibitory potency at about the same times as LO. Possibly, the inhibitory activity of both compounds is being controlled by some other substance that is being used up at about 11 h. If so, tocopherols are good candidates for the compounds that are exhausted at the time of the inflection point. Frankel, *Lipid Oxidation*, Oily Press Ltd., Dundee, Scotland, pp. 244-245 (1998), which is hereby incorporated by reference in its entirety, suggested that MS may act synergistically with TBHQ and other phenolic antioxidants under frying conditions.

Near the end of the 32-h heating period, oils began to form surface skins. During continued heating, the skin spread to cover more of the surface on oils containing LO or MS than on the control oil. This observation might be considered to support a surface film mechanism for the action of MS and LO (Gordon, "The Mechanism of the Antioxidant Action in Vitro, in Hudson, ed., in *Food Antioxidant*, Elsevier, pp. 13-14 (1990), which is hereby incorporated by reference in its entirety). Although the skin was not apparent until about 32 h of heating, it could have been exerting an effect before it was observable. However, the kinetics in Tables 2 and 3 show that after the inflection points, the oils with additives had the same reaction rates as the control oil, so there seems to have been no obvious advantage that can be attributed to surface skin formation since it showed no effect when it was most obvious and wide spread. Thus, the eventual formation of a surface skin does not seem to be the mechanism by which LO and MS slow the oxidative changes in the oil. The skin was recovered by placing a metal screen under the surface and lifting out the skin. The skin was washed with hexane and converted to methyl esters. Analysis of the esters revealed elevations of saturates and decreases of polyunsaturates that were greater in extent than those observed for the bulk oils in Table 1. There also were peaks with longer retention times that probably represent oxidized esters that were not observed in the bulk oil.

The surface tension at ambient temperature of the soybean oil was 33.3 mN/M. The addition of MS in concentrations varying from 1 to 10 ppm in 1 ppm steps and LO ranging from 0.01 to 0.1% in 0.01% steps gave surface tensions ranging from 30.8-32.9 and 32.8-33.3 mN/M, respectively. Duplicates for MS showed considerably more variation than those of the control and LO additions. None of the levels of addition of LO or MS were significantly different from the control oil in a paired comparison test at $p \leq 0.05$, and there was no convincing trend for the surface tension to decrease with the amount of MS or LO added. But most of the additions of LO and MS gave slightly lower surface tensions than the control oil, and comparison of the levels of MS and LO as groups with the controls were significantly different for both additives. However, these observations do not make a convincing case for the accumulation of MS or LO in the oil surface.

In sum, linalyl oleate (LO), an interesterification product of linalyl acetate (LA) and methyl oleate catalyzed with sodium methoxide, was examined to determine its effectiveness in retarding oxidative changes in soybean oil heated continuously at $180 \pm 5°$ C. for 32 h. The identity of linalyl oleate was established by gas chromatography-mass spectrophotometry (GC-MS) and nuclear magnetic resonance (NMR). Linalyl oleate was tested at levels of 0.05 and 0.1%, and compared with the more commonly used synthetic autoxidation inhibitor, methyl silicone (MS), at levels of 5 and 10 ppm. Fatty acid changes and conjugated dienoic acid formation were monitored. First order kinetic equations were used to model the decreases in linoleate (18:2)/palmitate and linolenate (18:3)/palmitate ratios. Plots of the data showed an inflection point at ~11 h. Oils with either level of MS and LO had lower reaction rate constants before the inflection points, and lower conjugated diene values and higher 18:2 and 18:3 percentages at the end of the 32-h heating period than did oil without additives and with LA. Linalyl oleate could replace methyl silicone in soybean oil during deep-fat frying but at levels about 100 times greater. In addition, linalyl oleate was less flavorful and less volatile than linalyl acetate.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of preventing or reducing oxidation of a frying oil during frying, said method comprising:
adding, to a frying oil, a terpene ester compound comprising a terpenol esterified with a fatty acid under conditions effective to prevent or reduce oxidation of the frying oil during frying.

2. The method according to claim 1, wherein said terpene ester compound is added to the frying oil at a concentration of about 0.01% to about 0.20% terpene ester in frying oil.

3. The method according to claim 1, wherein said terpene ester compound is a linalyl oleate.

4. The method according to claim 1, wherein said terpenol is selected from the group consisting of linalool, geraniol, farnesol, citronellol, isopulegol, nerol, alpha-terpenol, carveol, dihydrocarveol, perillyl alcohol, menthol, borneol, and terpinen-4-ol.

5. The method according to claim 1, wherein said fatty acid is a saturated or unsaturated fatty acid.

6. The method according to claim 1, wherein said frying oil is a completely or partially hydrogenated oil or a mixture thereof.

7. The method according to claim 1, wherein said frying oil is an interesterified oil or a mixture thereof.

8. The method according to claim 1, wherein said frying oil is a plant oil or an animal oil.

9. The method according to claim 8, wherein said frying oil is a plant oil selected from the group consisting of soybean oil, canola oil, corn oil, olive oil, cottonseed oil, safflower oil, sunflower oil, sesame oil, palm oil, linseed oil, rapeseed oil, peanut oil, coconut oil, palm kernel oil, and combinations thereof.

10. The method according to claim 8, wherein said frying oil is an animal oil selected from the group consisting of lard, tallow, milk fat, fish oil, whale oil, and combinations thereof.

11. A method of frying food products comprising:
providing a food product;
providing a frying oil composition which includes a frying oil and a terpene ester compound comprising a terpenol esterified with a fatty acid; and
frying the food product in the frying oil composition.

12. The method according to claim 11, wherein said terpene ester compound in the frying oil is at a concentration of about 0.01% to about 0.20%.

13. The method according to claim 11, wherein said terpene ester compound is a linalyl oleate.

14. The method according to claim 11, wherein said terpenol is selected from the group consisting of linalool, geraniol, farnesol, citronellol, isopulegol, nerol, alpha-terpenol, carveol, dihydrocarveol, perillyl alcohol, menthol, borneol, and terpinen-4-ol.

15. The method according to claim 11, wherein said fatty acid is a saturated or unsaturated fatty acid.

16. The method according to claim 11, wherein said frying oil is a completely or partially hydrogenated oil or a mixture thereof.

17. The method according to claim 11, wherein said frying oil is an interesterified oil or a mixture thereof.

18. The method according to claim 11, wherein said frying oil is a plant oil or an animal oil.

19. The method according to claim 18, wherein said frying oil is a plant oil selected from the group consisting of soybean oil, canola oil, corn oil, olive oil, cottonseed oil, safflower oil, sunflower oil, sesame oil, palm oil, linseed oil, rapeseed oil, peanut oil, coconut oil, palm kernel oil, and combinations thereof.

20. The method according to claim 18, wherein said frying oil is an animal oil selected from the group consisting of lard, tallow, milk fat, fish oil, whale oil, and combinations thereof.

* * * * *